May 21, 1935. F. G. SALCEDO Re. 19,583
SOUND REPRODUCING APPARATUS FOR ADVERTISING PURPOSES
Original Filed Dec. 13, 1929
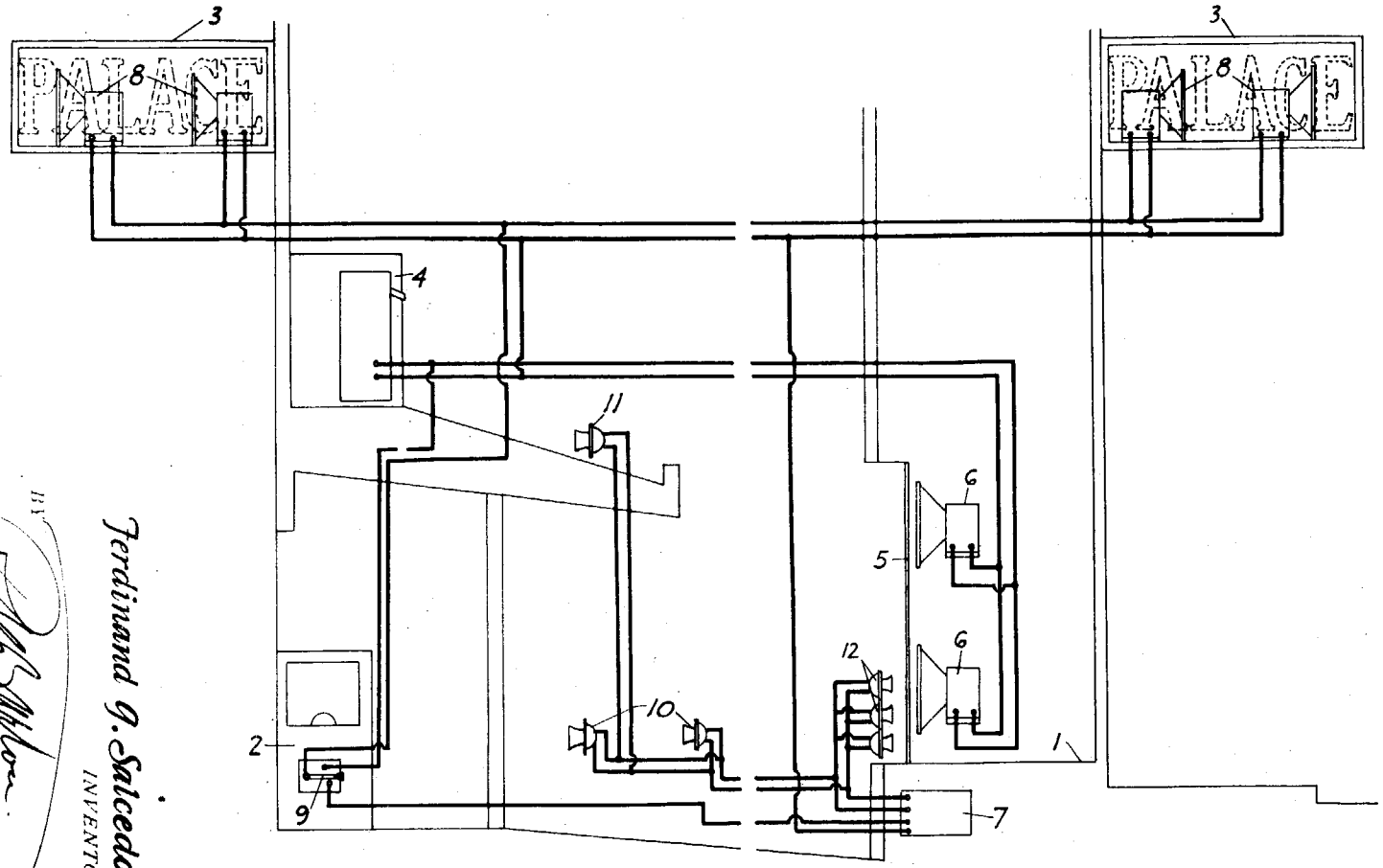
Ferdinand G. Salcedo
INVENTOR
BY
ATTORNEY Reissued May 21, 1935 Re. 19,583

UNITED STATES PATENT OFFICE 19,583

SOUND REPRODUCING APPARATUS FOR ADVERTISING PURPOSES

Ferdinand G. Saloedo, Hollywood, Calif., assignor to Consolidated Advertising Corp., Ltd., Los Angeles, Calif.

Original No. 1,873,790, dated August 23, 1932, Serial No. 413,911, December 13, 1929. Application for reissue May 21, 1934, Serial No. 726,776

10 Claims. (Cl. 179—100.1)

This invention relates to a sound reproducing apparatus for advertising purposes and more particularly to a novel arrangement of one or more microphones and loud speakers in combination with the combined sound and motion picture projection apparatus employed in theaters. It is an object of the invention to provide a more effective means for attracting the attention of people passing the theater and thereby influence them to attend the theater, thus rendering it unnecessary for the management to depend upon the ordinary pictures posted outside of the building to call the attention of the public to the performance being conducted therein.

Another object of the invention is to so construct the apparatus that it may be controlled, as for example, by the attendant at the ticket office of the theater, so as to transmit the amplified sound waves to pedestrians on the street at such periods in the production of a play as constitutes the culmination of intense human interest or some conspicuous psychological moment in the action of the play, thereby attracting the attention of those passing by the theater and exerting greater influence on them to visit the theater than that now obtained by the use of ordinary poster pictures.

Another object of the invention is to provide, in an apparatus of the character above described, means whereby, not only the sound waves reproduced incident to the projection of the motion picture may be transmitted and amplified exteriorly of the theater, but also the applause, laughter, and other vociferations of the audience occurring within the theater, so that passers-by, being attracted either by the sound waves from the reproduction apparatus or the tumult raised by the audience, will be influenced to gain entrance to the theater and witness the scenes projected on the screen.

Still another object of the invention is to provide for combined sound and motion picture theaters means for transmitting, from the interior of the theater parts of the sound program arising from the orchestra in the orchestra pit and to deliver the sounds thus transmitted to one or more loud speakers located adjacent to the sign or signs in front of the theater so that the attention of people passing by will be attracted to such signs and they will thus be led to read the name of the theater and also any other information which may be conveyed adjacent the sign.

Yet another object of the invention is to provide an apparatus whereby the motion picture houses or theaters constituting a chain, may have announcements made in different ones of the theaters as to the programs being carried out in the other theaters, during intermissions and at the termination of periods of exhibition.

Yet still another object of the invention is to provide a sound reproducing means which will, along with the other objects and advantages which have been mentioned, be capable of transmitting to the exterior of the theater portions of spoken drama recitals, lectures and the like from the stage thereof, in order that these may be heard by persons in front of the theater and result in such persons becoming interested in the melodrama being enacted.

The figure of the accompanying drawing is a diagrammatic view illustrating in a general way, the interior arrangement of a theater or motion picture house as well as the arrangement of parts of the apparatus, which are located exteriorly of the theater or motion picture house.

In the drawing the stage is indicated by the numeral 1, the ticket office by the numeral 2, and the numeral 3 indicates, for example, signs which are arranged upon the front of the theater and bear the name thereof. The numeral 4 indicates the motion picture projection room in which the combined sound and motion picture projection apparatus, and the operator for controlling the same, is contained, and the screen, upon which the pictures projected from the projection apparatus by the projectionist, is indicated by the numeral 5. In addition to the usual amplifiers or loud speakers 6, which are customarily arranged in rear of the screen 5, an amplifier unit 7 comprising a part of my invention is provided.

In carrying out the invention, loud speaker units 8 are located in proximity to the signs 3 or exteriorly of the theater and are in circuit with the sound reproducer located within the projection room 4 of the theater. Speakers 6 are also connected to the sound reproducer but in another circuit. The latter circuit may be appropriately termed a parallel circuit. The former circuit is controlled by a switch 9 of any appropriate type conveniently located, such as adjacent the ticket seller in the ticket office 2, whereby the sounds or movietones from the sound and picture reproduction apparatus may be transmitted to points exteriorly of the theater.

As previously stated the invention also contemplates an arrangement whereby the applause, cheering or laughter of the audience may be transmitted to points exteriorly of the theater to attract the attention of, and interest passers-by. This is accomplished by the use of microphones 10 preferably arranged at points about the orchestra floor of the theater, one or more microphones 11 located in the balcony of the theater, and other microphones 12 located close to the stage and therefore close to the orchestra, if musicians are employed to render music, in addition to that rendered by the sound and picture reproduction apparatus.

Amplifier 7 amplifies the sounds picked up by microphones 10, 11 and 12, and switch 9 also controls the circuit which places speakers 8 in circuits with the microphones 10, 11 and 12 and the amplifier 7, so that passers-by in the thoroughfare, at which the theater is located, will hear not only the sound waves which are being reproduced by the sound reproducer, but also the sound waves from the applauding audience, and renditions of the orchestra, if the orchestra is playing, or words spoken or sung from the stage, and be thereby influenced to attend the performance.

It will be understood of course that the illustration of the drawing is merely representative of one possible arrangement of microphones and amplifying or loud speaker units and that numerous other arrangements may be employed, without departing from the spirit of the invention.

As previously stated, where an apparatus is employed by a chain of theaters, or where any of the principles of the invention may otherwise find embodiment, microphonic and amplifying units may be arranged at the different theaters and electrically coupled in such a manner as to permit transmission from one theater to another.

What I claim is:—

1. In combination, a theater having a sound and picture reproduction apparatus located therein, loud speaker units located exteriorly of the theater, microphones located within the theater, an amplifier for the microphones, a control switch in the theater, an electrical circuit between the loud speaker units and the sound and picture reproduction apparatus and controlled by the switch, and an electrical circuit between the loud speaker units and the microphones and the amplifier therefor and controlled by said switch whereby either music and applause within the theater or movietones from the sound reproduction apparatus may be transmitted exteriorly of the theater.

2. A theater having a sound and picture reproduction apparatus located therein, loud speaker units located exteriorly of the theater, microphones located within the theater, an amplifier for the microphones, a control switch in the theater, an electric circuit between the loud speaker units and the sound and picture reproducing apparatus, and controlled by the switch, and an electric circuit between the loud speaker units and the microphones and the amplifier therefor and controlled by said switch.

3. A sound reproducing apparatus for advertising purposes comprising loud speakers arranged exteriorly of a theater, and a sound and moving picture reproducing apparatus, microphones and an amplifier for said microphones located within the theater, means electrically connecting said microphones and amplifier to said loud speakers, and means electrically connecting said sound reproducing apparatus and said loud speakers, said microphones being positioned to receive sound from said apparatus, and a control switch associated with both of said means whereby said loud speakers may be placed either in circuit with said microphones and amplifier or the sound reproduction apparatus.

4. In apparatus for continuing whole or partial cycles of the sound vibrations produced within a theatre to onlisteners exteriorly of the theatre for the purpose of inducing the onlisteners to become patrons of the theatre comprising the sound reproducing apparatus, a loud speaker arranged exteriorly of a theatre, microphones and an amplifier for said microphones located within the theatre, wiring connecting the microphones and amplifier to said loud speaker, other wiring connecting said sound reproducing apparatus to said loud speaker, and a control switch associated with both branches of said wiring whereby the loud speaker exteriorly of the theatre may be placed directly in circuit with the sound reproducing apparatus of the moving pictures or indirectly therewith thru the medium of the microphones and amplifier within the theatre.

5. In combination, a theatre having a sound reproduction apparatus therein, including electrical loud speakers for giving off the sound vibrations produced thereby, a sign located exteriorly of the theatre, electrical loud speakers located exteriorly of the theatre adjacent said sign, microphones positioned in the theatre to receive the sound produced by the audience together with the sound vibrations emanating from the first mentioned loud speakers, an amplifier for said microphones, wiring forming a circuit which includes said microphones, amplifier and last mentioned loud speakers, and means for selectively connecting the exterior loud speakers to the sound reproduction apparatus and the amplifier.

6. In an apparatus of the kind described, an electrical loud speaker arranged exteriorly of the interior of a building, microphones and an amplifier for said microphones located within the building, a sound reproducing apparatus, wiring connecting said sound reproducing apparatus to said speaker, other wiring connecting the microphones and amplifier in series with the speaker, and means associated with both of said wirings whereby the loud speaker exteriorly of the building may be placed selectively directly in circuit with the sound reproducing apparatus and indirectly therewith through the medium of the microphones and amplifier within the interior.

7. A sound reproducing apparatus for advertising purposes comprising electrical loud speakers arranged exteriorly of a theatre, other electrical loud speakers arranged within said theatre, a sound reproducer including an amplifier in said theatre, means to provide all of said loud speakers simultaneously with the same sound vibrations given off by said sound reproducer, said means consisting of a two part electric circuit, one part including said sound reproducer and interior loud speakers, and the other including said exterior loud speakers, microphones located in the acoustical shadow of the loud speakers in the theatre and an amplifier for said microphones; and a switch common to the two part circuit.

8. In a sound system, a sound reproduction apparatus including a record reproducer and an amplifier, an electrical loud speaker, an electrical circuit between the loud speaker and the sound reproduction apparatus, a second electrical loud speaker in circuit with said sound reproduction apparatus, microphones in the acoustical shadow of said second loud speaker, an electrical circuit between said first loud speaker and microphones and including an amplifier, and a switch common to both of said circuits for controlling the circuit from said sound reproducing apparatus to the first said loud speaker and from the microphones to the first said loud speaker.

9. A sound reproducing apparatus for advertising purposes comprising electrical loud speakers arranged exteriorly of a theatre, microphones and an amplifier located within the theatre, means electrically connecting the microphones and amplifier and in turn the amplifier and the loud speakers, a sound reproducing apparatus, means electrically connecting the loud speakers and sound reproducing apparatus, and a control switch associated with both of said means to place the loud speakers exteriorly of the theatre in circuit selectively with said sound reproducing apparatus and with said microphones and amplifier.

10. The combination with a theatre, of a sound reproducing apparatus for moving pictures in the theatre, electrical loud speakers directly reproducing to the audience in the theatre the sound vibrations emanating from the sound apparatus, other electrical loud speakers positioned at points exterior of the theatre for reproducing to the public outside the theatre the same sounds that are reproduced to the patrons in the theatre, and means to provide all of said loud speakers simultaneously with the same sound vibrations and including means selectively connecting the exterior loud speakers directly and indirectly with the sound reproducing apparatus.

FERDINAND G. SALCEDO.